United States Patent
Swift

(10) Patent No.: US 9,203,917 B1
(45) Date of Patent: *Dec. 1, 2015

(54) TRACKING USER AFFINITY THROUGH INTERACTIONS WITH MEDIA FILES

(71) Applicant: Amazon Technologies, Inc., Seattle, WA (US)

(72) Inventor: Michael Allen Swift, Puyallup, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,807

(22) Filed: Jan. 2, 2015

Related U.S. Application Data

(63) Continuation of application No. 13/709,693, filed on Dec. 10, 2012, now Pat. No. 8,930,977.

(51) Int. Cl.
*G06F 13/00* (2006.01)
*G06F 3/00* (2006.01)
*H04N 5/445* (2011.01)
*H04L 29/08* (2006.01)
*G06F 3/0484* (2013.01)

(52) U.S. Cl.
CPC .............. *H04L 67/22* (2013.01); *G06F 3/0484* (2013.01); *H04L 67/02* (2013.01)

(58) Field of Classification Search
CPC .......................... H04H 60/43; H04N 21/44222
USPC .......................................... 725/13–14, 60–61
See application file for complete search history.

(56) References Cited

U.S. PATENT DOCUMENTS

| | | | |
|---|---|---|---|
| 5,351,075 A | 9/1994 | Herz et al. | |
| 6,018,768 A | 1/2000 | Ullman et al. | |
| 6,457,010 B1 | 9/2002 | Eldering et al. | |
| 6,760,916 B2 | 7/2004 | Holtz et al. | |
| 7,493,636 B2 | 2/2009 | Kitsukawa et al. | |
| 7,752,642 B2 * | 7/2010 | Lemmons | 725/32 |
| 8,627,379 B2 | 1/2014 | Kokenos et al. | |
| 2008/0037951 A1 | 2/2008 | Cho et al. | |
| 2010/0050202 A1 * | 2/2010 | Kandekar et al. | 725/14 |

OTHER PUBLICATIONS

"https://www.facebook.com/Tengu810/timeline/2010," Apr. 18, 2014.

* cited by examiner

*Primary Examiner* — Hunter B Lonsberry
(74) *Attorney, Agent, or Firm* — Athorus, PLLC

(57) ABSTRACT

A user's interactions with a media player during the playing of a media file may provide a variety of information regarding the user's interests in the media file, or in any objects, images, sounds, individuals, things or themes expressed or described therein. A media player or the software operating thereon may be modified to receive interactions from the user and/or to analyze such interactions in order to associate the user with such objects, images, sounds, individuals, things or themes. The user's interactions may also be analyzed by a media service, an online marketplace or any external location in order to identify any items related to such objects, images, sounds, individuals, things or themes, or for any other purpose.

16 Claims, 7 Drawing Sheets

TRACKING USER AFFINITY THROUGH INTERACTIONS WITH MEDIA FILES

CROSS-REFERENCE TO RELATED APPLICATIONS

This application is a continuation of U.S. patent application Ser. No. 13/709,693, filed Dec. 10, 2012, the contents of which are incorporated by reference herein in their entirety.

BACKGROUND

The advent of portable digital media devices has revolutionized the way that consumers may purchase, receive and enjoy audio, video and other forms of multimedia. Previously, media-playing machines were generally limited to dedicated music or video devices such as video cassette players or compact disc (CD) players, which required a user to insert a component (such as a video tape or a CD) containing read-only media into the device in order to play the media, and to remove the component from the device when the playing of the media was complete. While such devices permitted users to listen to or view media in one of a select few discrete formats, a user's options for interacting with such devices or the media being played thereon was limited to merely starting or stopping the playing of the media, advancing (i.e., "fast-forwarding") to portions of the media that have not yet been played, or returning (i.e., "rewinding") to portions of the media that were previously played.

Contemporary media players, however, are versatile processor-driven machines that permit users to easily obtain and play media files at their discretion. Such players typically include one or more software applications for receiving and playing a variety of multimedia files obtained through wired or wireless connections with external sources (such as a desktop or laptop computer, or one or more networked servers), including but not limited to songs, movies and "podcasts," or regularly produced audio or video files that generally relate to a common topic and are distributed over a network. Once a media file has been received by a media player, the media file may be played time and time again, until the file are manually or automatically deleted from the media player.

Unlike their counterparts of yesteryear, today's media players can do far more than simply play audio or video files. Most media players include one or more applications for reading and displaying information regarding the media files that are being played (e.g., the title of the file, as well as the time, chapter or other reference to the portion of the file being played), and for pinpointing respective portions of the media files to be played. For example, most media players include one or more buttons or other selectable features for not only playing, pausing, stopping, fast-forwarding or rewinding the media files, but also for taking any other pertinent action regarding the media files (e.g., adding the media files to one or more playlists, storing the media files in one or more locations on the players or on any associated hardware, or deleting the media files). Additionally, many media players may be linked or associated with the Internet either directly through one or more wired or wireless means, or indirectly through an Internet-enabled computer device with which it is connected.

Media files may be purchased and/or obtained from one or more online sources, such as an online media service or online marketplace. As with the purchase of nearly any item, the purchase of media files by a customer is typically a clear indication that the customer is interested in the contents of media, either for himself or herself, or on behalf of another person as a gift. Other than the fact that the media was purchased by or on behalf of the user, or that the user may be interested in playing all or a portion of it, existing systems and methods for distributing digital media over the Internet are unable to obtain or deduce any other information regarding the user based on his or her playing of the media file.

DETAILED DESCRIPTION

Figure 1:
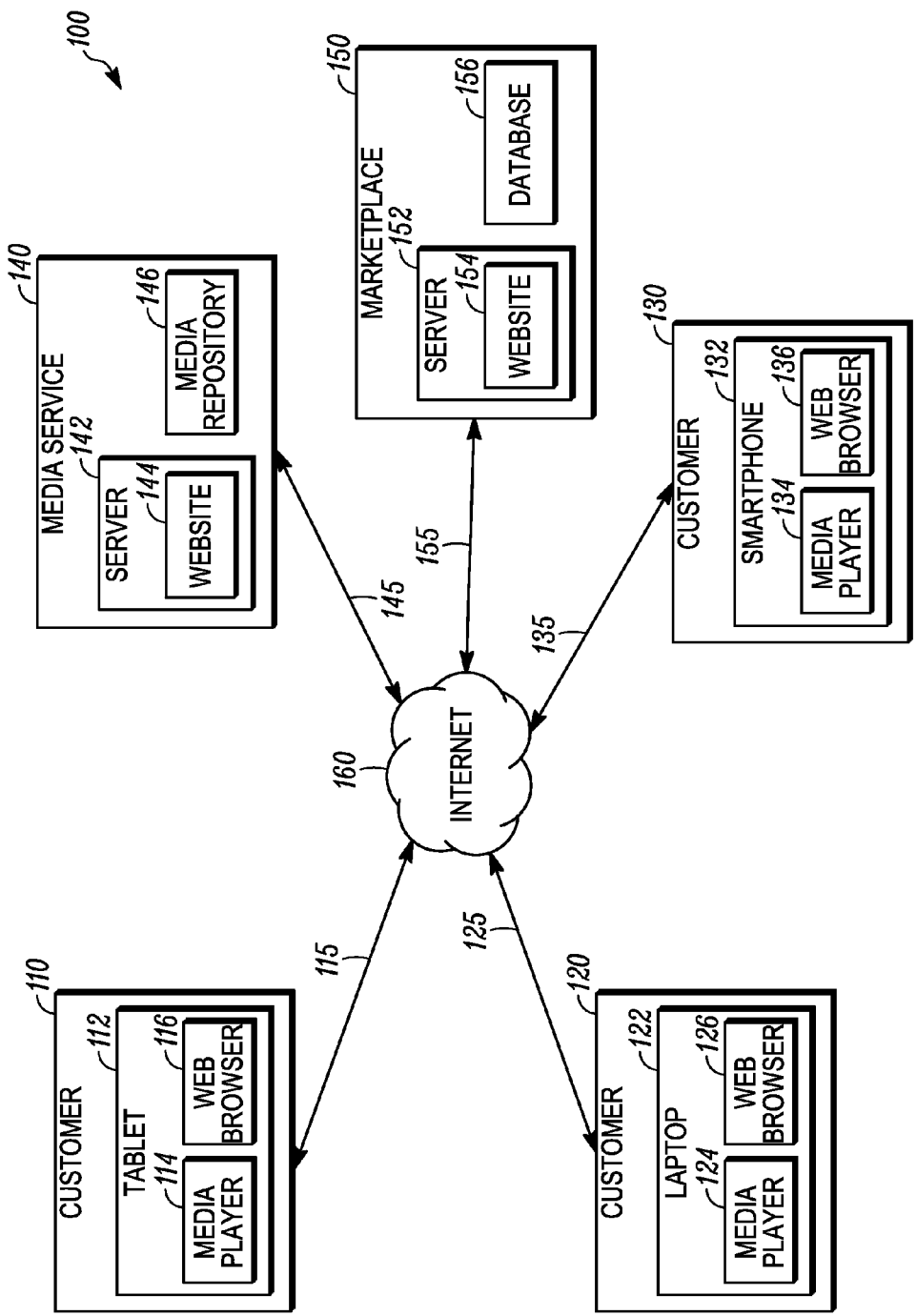
FIG. 1 is a block diagram of components of a method and system for tracking a user's affinity for one or more media files, or the contents thereof, in accordance with embodiments of the present disclosure.

As is set forth in greater detail below, the present disclosure is directed to systems and methods for tracking user affinity through media files. Specifically, the present disclosure describes system and methods for tracking a user's preferences or interests in one or more media files, or in the objects, images, sounds, individuals, things or themes expressed or described therein, as determined based on his or her interactions with the one or more media files as they are played on a media player or like device. Such interactions and information pertaining thereto may be captured by the media player and analyzed to identify the portions of the media file that are of interest to the user, and other relevant information regarding the playing of the media file, and to associate such portions or such other relevant information with the user.

The systems and methods of the present disclosure may be utilized to track a user's affinity with a media file or the contents thereof, by receiving or sensing the user's interactions with the media file as the media file is being played, and associating the user with the portions of the media file that were being played at the respective times at which the user's interactions were received. In this regard, those of ordinary skill in the pertinent art would recognize that the systems and methods disclosed herein may be employed by any type of media player or media playing device, including audio players, video players, personal digital assistants, mobile telephones, smartphones, computers, entertainment systems, readers or any other like device. Likewise, those of ordinary skill in the pertinent art would also recognize that the systems and methods disclosed herein may be utilized in connection with the playing of any type of media file, including but not limited to Moving Picture Experts Group Layer-3 (or ".MP3"), Windows Media Audio (or ".WMA"), Waveform Audio File Format (or ".WAV"), Audio Interchange File Format (or ".AIF") files, or any other type of audio files; Moving Picture Experts Group (or ".MPG" or ".MPEG"), Apple QuickTime (or ".MOV"), Windows Media Video (or ".WMV") files, or any other type of video files; Portable Document Format (or ".PDF") or PowerPoint Presentation (or ".PPT") files; any type of electronic book (or "e-book") files; or any other type of media files. In accordance with the systems and methods of the present disclosure, such files may be of standard, read-only form, or may be versatile files that may be modified to receive and store metadata or other information that may be identified or selected during the viewing of the media file.

A user's interactions may be received or sensed by a media-playing device during the playing of a media file in any number of ways in accordance with the present disclosure. For example, a media-playing device, or a remote control associated with such a device, may be built to include one or more dedicated buttons or other selectable features that are strictly reserved for the purpose of capturing such an interaction during the playing of a media file. Alternatively, one or more existing buttons or selectable features on an existing media-playing device, or on a remote control associated with such a device, may be utilized to record an interaction (e.g., a selection of a "play" button while a media file is already playing). In this regard, a user's selection of such a button may be deemed an interaction with the media file, or a portion thereof, that is worth of further analysis. Additionally, software applications for playing media files on versatile devices (such as a media player, a smartphone, or any other type of computer) may be programmed to provide user interfaces in the form of overlays or other selectable features that appear over or during a media file as it is being played, such as upon the selection of a "pause" or "stop" button. Such features may be selected using a pointer (e.g., a mouse, a trackball or other like apparatus), or a touchscreen-enabled video display, and may be used to capture interactions regarding the media file in general as well as portions of the media file in particular, including images, time clippings, frames, sounds or other aspects thereof.

Moreover, any type of user interaction and any other information that may be captured during the playing of a media file may be analyzed using one or more of the systems and methods disclosed herein. For example, a user's selection of any buttons or other selectable features associated with a media player and/or a media file being played thereon may be analyzed to determine his or her interest in a portion of the media file. Likewise, the user's actions in viewing a media file (i.e., in causing the media player to begin playing the media file, or in pausing, fast-forwarding, rewinding or stopping the playing of the media file) may be interpreted as indications of the user's satisfaction or dissatisfaction with the media file, or the contents thereof. In view of such actions, a user may be deemed to be interested in portions of a media file that he or she elects to play, and disinterested in portions of a media file that he or she elects not to play. A user may be further deemed to be interested in portions of a media file that he or she rewinds and replays for a second time, and disinterested in portions of a media file that he or she fast-forwards through or otherwise elects to bypass. Moreover, according to the systems and methods of the present disclosure, a user may directly select any items, objects, images, individuals or things as they appear on a media player display during the playing of a media file.

The systems and methods of the present disclosure may also capture and/or record information that originates from a location that is external to or independent of the media player or the media file and analyze such information along with the user's interactions. For example, the times, dates and/or locations at which the media files are played may be determined from a clock or a Global Positioning System (GPS) transceiver that may be included within or otherwise accessible to the media player.

Once captured, a user's interactions and/or other related information may be stored within the media file itself, or in a record maintained in a cache or other shell file, and may be subsequently analyzed in order to determine the user's affinity for the media file and/or the objects, images, sounds, individuals, things or themes expressed or described therein. Such interactions and/or other information may be analyzed using one or more processors associated with either the media player itself or an external server. For example, a file containing information regarding such interactions is stored may be returned to the external source from which the media file originated, or to another server or location, for analysis.

A user's interactions with a media player or a media file may be correlated with the contents of the media file in any number of ways. For example, a media file may be marked with metadata corresponding to the user's interactions therewith, such as by embedding times, dates, locations or other information regarding the user's interactions into the media file, and the metadata may be subsequently analyzed by the media player, a media source or one or more computers maintained at an external location. In other situations, where a media file is not adapted to receive such metadata, a record of such interactions may be stored or maintained in a cache or other database, along with a time stamp or other identifier of the portion of the media file at which the interactions were received. Such a record may be correlated with the contents of the media file that were playing at the time of the user's interaction therewith, either in real-time or after the user has finished playing the media file.

Information regarding a user that has been captured during the playing of a media file, and correlated and associated with the user, may be utilized in any number of ways. For example, the information may be aggregated with that of other users who viewed the same media file, in order to gauge the popularity of the media file, or portions thereof. The information may also be used to target goods, products, services or information of any type or form that are shown in the media file, or are related to any objects, images, sounds, individuals, things or themes expressed or described therein, to the user.

Accordingly, during the playing of a media file on a media player by a user, the systems and methods of the present disclosure may be adapted to receive interactions from the user and any other pertinent information, to correlate the interactions with the portions of the media file that were playing at the time that the interactions were received, and to associate those portions, and any objects, images, sounds, individuals, things or themes expressed or described therein, with the user. Such associations and other pertinent information may be utilized for any commercial purpose.

Referring to FIG. 1, the various components of one embodiment of an interactive system 100 for tracking user affinity through media files in accordance with the present disclosure are shown. The system 100 includes a plurality of customers 110, 120, 130 (or users, consumers, clients, shoppers or buyers), a media service 140 and an online marketplace (or supplier, retailer, seller, reseller or distributor) 150.

The customers 110, 120, 130 may be any entities or individuals that wish to download, purchase, rent, lease, borrow, or otherwise obtain media files (which may include media of any type or form, such as audio, video, electronic books or other multimedia files) from the media service 140, and may also wish to download, purchase, rent, lease, borrow or otherwise obtain items (which may include goods, products, services or information of any type or form) from the marketplace 150. The customers 110, 120, 130 may utilize one or more computing devices, such as a tablet computer 112, a laptop computer 122 or a smartphone 132, which may operate or access one or more software applications, such as an media player 114, 124, 134 and/or a web browser 116, 126, 136. The tablet computer 112, the laptop computer 122, or the smartphone 132 utilized by the customers 110, 120, 130 may be connected to or otherwise communicate with the media service 140, the marketplace 150 or one another through a communications network 160, such as the Internet, as indicated by lines 115, 125, 135, 145, 155, by sending and receiving digital data over the network 160.

The media player applications 114, 124, 134 operating on the tablet computer 112, the laptop computer 122 or the smartphone 132, respectively, provide one or more features or user interfaces that permit the customers 110, 120, 130 to play (i.e., to view, to listen to, to rebroadcast or to otherwise operate) media files that may be embedded and/or stored thereon, and may have been obtained from the media service 140, the marketplace 150, or another source. The web browsers 116, 126, 136 operating on the tablet computer 112, the laptop computer 122 or the smartphone 132, respectively, provide one or more features or user interfaces that permit the customers 110, 120, 130 to view and access online content, such as the content provided at one or more web sites, including but not limited to the media service web site 144 and/or the marketplace web site 154. Also, those of skill in the pertinent art will recognize that the customers 110, 120, 130 may use a keyboard, keypad, mouse, stylus, touch screen, or other device (not shown) or method for interacting with the tablet computer 112, the laptop computer or the smartphone 132, respectively, the media player applications 114, 124, 134 and/or the web browsers 115, 125, 135, or to "select" an item, link, node, hub or any other aspect of the present disclosure.

The media service 140 may be any entity or individual that provides or otherwise makes available digital media including audio sounds, video imagery and/or any other form of multimedia for downloading, purchasing, renting, leasing or borrowing by customers, such as the customers 110, 120, 130. The media service 140 may include or operate one or more physical computer servers 142 and/or media repositories 146, and may display or maintain a web site 144 which may be implemented using one or more of the servers 142 and offer media content that may be stored or maintained in the one or more media repositories 146. The media service 140, the servers 142 and/or the media repositories 146 may be connected to or otherwise communicate with the customers 110, 120, 130 or the marketplace 150 through the communications network 160, as indicated by line 145, by sending and receiving digital data over the network 160.

The marketplace 150 may be any entity that sells or otherwise makes items available for download, purchase, rent, lease or borrowing by customers, such as the customers 110, 120, 130. The items made available at the marketplace 150 may be obtained from one or more third party vendors, merchants or manufacturers (not shown), and the marketplace 150 itself may be a vendor, a merchant or a manufacturer. Additionally, the marketplace 150 itself may also be a media service, such as the media service 140, in that it may make digital media including audio sounds, video imagery and/or any other form of multimedia available for downloading, purchasing, renting, leasing or borrowing by customers, such as the customers 110, 120, 130, along with any other goods, services or other items.

The marketplace 150 may include or operate one or more physical computer servers 152 and databases 156, and maintain a marketplace web site 154 which may be implemented using one or more of the servers 152. Additionally, the marketplace 150 may feature software applications and/or hardware components for analyzing data received from customers, such as customers 110, 120, 130, including data regarding a customer's affinity for one or more aspects of a media file. The marketplace 150, the servers 152 and/or the databases 156 may be connected to or otherwise communicate with the customers 110, 120, 130 or the media service 140 through the communications network 160, as indicated by line 155, by sending and receiving digital data over the network 160.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the terms "user," "customer," "consumer," or like terms, may refer to any entity or individual that wishes to download, purchase, rent, lease, borrow, or otherwise obtain items or media from a marketplace and/or a media service, as well as the associated computer systems operated or controlled by a customer, a consumer or a user, respectively.

Except where otherwise explicitly or implicitly indicated herein, the term "media service," or like terms, may refer to any entity or individual that sells or otherwise makes media content available for download, purchase, rent, lease or borrowing using one or more computer systems, as well as the associated computer systems operated or controlled by such a service. Except where otherwise explicitly or implicitly indicated herein, the term "marketplace," or like terms, may refer to any entity or individual that sells or otherwise makes items available for download, purchase, rent, lease or borrowing using one or more computer systems, as well as the associated computer systems operated or controlled by such a marketplace.

Thus, process steps described as being performed by a "user," a "customer" or a "consumer," a "media service" or a "marketplace" may be automated steps performed by their respective computer systems or devices, or implemented within software modules (or computer programs) executed by one or more computer systems or devices. Specially designed hardware could, alternatively, be used to perform certain operations.

The customers 110, 120, 130 may use any software, web-enabled or Internet applications operating on a computing device 112, 122, 132, such as the media players 114, 124, 134 or the web browsers 116, 126, 136, or any other client-server applications or features including electronic mail (or E-mail), short or multimedia messaging service (SMS or MMS) text messages, or other messaging techniques to communicate with (or connect to) the media service servers 142 and/or web sites 144, or the marketplace servers 152 and/or web sites 154, through the communications network 160. In addition, while the customers 110, 120, 130 are shown in FIG. 1 as using a tablet computer 112, a laptop computer 122 and a smartphone 132, respectively, the computing devices utilized by users in accordance with the present disclosure may be any of a number of computer-related machines that are capable of communicating over the network 160, including but not limited to set-top boxes, personal digital assistants, mobile telephones, digital media players, web pads, desktop computers, televisions, automobile entertainment systems, appliances, electronic book readers, and the like. The protocols and components for providing communication between the computing devices 110, 120, 130 and/or the media players 112, 122, 132 or the web browsers 116, 126, 136, the media service server 142 and/or web site 144, and the marketplace server 152 and/or web site 154, are well known to those skilled in the art of computer communications and thus, need not be described in more detail herein.

The data and/or computer executable instructions, programs, firmware, software and the like (also referred to herein as "computer executable" components) described herein may be stored on a computer-readable medium that is within or accessible by the tablet computer 112, the laptop computer 122, the smartphone 132, the media service servers 142 and/or the marketplace servers 152, and having sequences of instructions which, when executed by a processor (such as a central processing unit, or CPU), cause the processor to perform all or a portion of the functions and/or methods described herein. Such computer executable instructions, programs, software and the like may be loaded into the memory of the tablet computer 112, the laptop computer 122, the smartphone 132, the media service servers 142 and/or the marketplace servers 152 using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read only memories (EPROMs), electrically erasable programmable read only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure is generally directed to systems and methods for tracking a user's affinity for a media file, or for the contents thereof or the objects, images, sounds, individuals, things or themes expressed or described therein, based on the user's interactions with a media player that is playing the media file, and other pertinent information. Preferably, the systems and methods disclosed herein are directed to tracking the media files (or the portions thereof) that are played by the user; the times, dates and/or locations at which the media files are played; any actions taken by the user with regard to the playing of the media files (i.e., causing the media player to play, pause, fast-forward, rewind or stop the playing of the media files), which may be implicitly associated with the respective contents of the media files; or any actions taken by the user that are independent of the playing of the media files (i.e., selecting one or more buttons or other selectable features to indicate his or her preference or disdain for all or a portion of the media files), which may be expressly associated with the respective contents of the media files. Once the pertinent portions of the media file and any relevant information have been identified, such portions and/or information may be associated the user, and utilized or exploited for any purpose. For example, one or more of the portions of the media file and/or some of the relevant information may be utilized to evaluate the popularity or suitability of the media file, or to target applicable marketing efforts to the user, or to like users. Moreover, the portions and/or information may be transmitted via electronic mail or other messaging services, or posted to one or more social networks, on behalf of the user, like users or any other individual or entity.

For the purposes of illustration, some of the systems and methods disclosed herein may be referenced primarily in the context of the playing of a media file that includes video imagery (e.g., a motion picture, a television program, a video podcast or any other like file) on a versatile processor-based device that may be adapted to download or otherwise obtain a media file form a media service and to play the media file thereon (e.g., a tablet computer, a laptop computer or a smartphone), such as the tablet computer 112, the laptop computer 122 or the smartphone 132 of the interactive system 100 shown in FIG. 1. As will be recognized by those of skill in the art, however, the systems and methods disclosed herein may also be used in many other situations or with many other components that may be adapted to play media files and to track a user's interactions therewith, and are not limited to an electronic commerce context.

Figure 2:
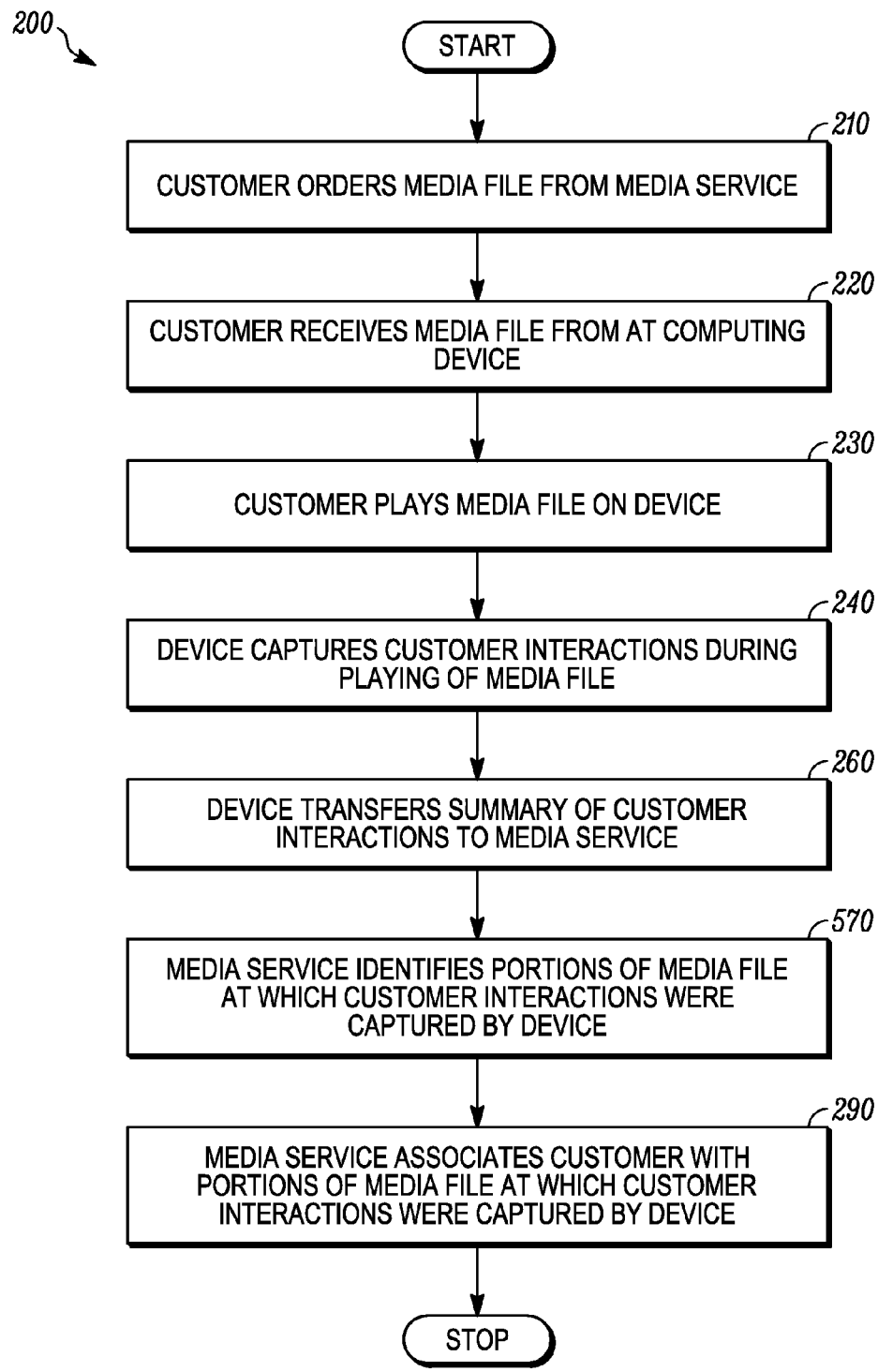
FIG. 2 is a flow chart of a method for tracking a user's affinity for one or more media files, or the contents thereof, in accordance with embodiments of the present disclosure.

Referring to FIG. 2, a flow chart 200 representing one embodiment of a method for tracking a user's affinity for one or more media files, or the contents thereof, based on his or her interactions with a computing device during the playing of a media file according to the present disclosure is shown. At step 210, the customer orders the media file from a media service, such as the media service 140 shown in FIG. 1. The media file may include audio, video or multimedia features, or any other type or form of media content, or any related information (e.g., metadata pertaining to the media content, such as tables of contents). At step 220, the customer receives the media file at the computing device, and at step 230, the customer begins to play the media file on the device. For example, the customer may order and receive the media file at a first computing device (e.g., a laptop or desktop computer) and may transfer the media file to a second computing device (e.g., a media player or smartphone) via wireless or wired means, and begin to play the media file. Alternatively, the customer may order a media file from a media service directly from the computing device on which he or she intends to play the media file.

At step 240, during the playing of the media file, the computing device captures any interactions that the customer may make with the device and/or the media file. Such interactions may be initiated by the customer through the selection of one or more buttons or other features on a console, a touchscreen or any other aspect of the computing device (e.g., a remote control). Additionally, the computing device may also record other information, such as the time, date and location at which the customer elected to view the media file, or any other operating or environmental conditions associated with the playing of the media file (i.e., any other applications that were concurrently running on the computing device at the time that the media file was played, or any other media files that may have been present on the computing device at the time that the media file was played). For example, the device may record the times and/or portions of the media file that the customer elected to play, pause, repeat (i.e., the portions of the media file that the customer elected to rewind and play again, or to view for a second or subsequent time) or skip (i.e., the portions of the media file that the customer elected to fast-forward through, or the portions of the media file that were never played by the customer), and store such information in a record maintained in a cache or other database on the computing device. Alternatively, the device such information may be stored as metadata within the media file itself.

At step 260, the computing device transfers a summary of the customer's interactions to the media service from which the media file was ordered. For example, the computing device may transmit a record containing a summary of the customer's interactions captured during a playing of the media file, or an altered version of the media file itself that includes information regarding such transactions, back to the media service. At step 270, the media service identifies portions of the media file where customer interactions were captured by the device. For example, where a user provides one or more positive interactions with a media player at specific times during the playing of a media file, the media service may review the media file and determine what portions of the media file were being played then, such as a particular scene of a movie, a particular verse of a song, or a particular passage of an audio or video podcast. At step 290, the media service associates the customer with the portions of the media file at which customer interactions were captured by the device. For example, if it is determined that the customer provided an interaction during a particular scene of a movie, the media service may associate the customer with any or all of the contents of that particular scene, such as any particular people, actors, customers, products, etc., that may have been shown during the scene.

Accordingly, feedback in the form of interactions from a customer who is playing a media file may provide a marketplace and/or a media service with further information regarding the customer or the media file itself. Information regarding the interactions may be received by a media player and transferred to the media service that the next available opportunity, i.e., when the media player is next synchronized with a host computer or is able to access the media service through the Internet. Such information may be associated with an individual customer, or combined with related information obtained from other customers who viewed the same media file and analyzed in the aggregate. Moreover, although the process described in the flow chart 200 shown in FIG. 2 contemplates capturing a customer's interactions at a media device and transferring a summary of the customer's interactions to a media service for analysis, the analysis of the customer's interactions may also occur within the media player, and the correlated data may then be transferred to a media service or a marketplace for further analysis or for any other purpose.

As is discussed above, a customer's interactions with a media file may be sensed and recorded in any form. For example, such interactions may be received in a binary form (i.e., a single indication pertaining to a portion of a media file, without any further information regarding the contents of the media file being played at that point), such as in response to the selection of a button. Additionally, such interactions may be determined based on a customer's actions in playing the media file, such as starting, stopping, playing, fast-forwarding or rewinding the media file.

Figures 3A, 3B:
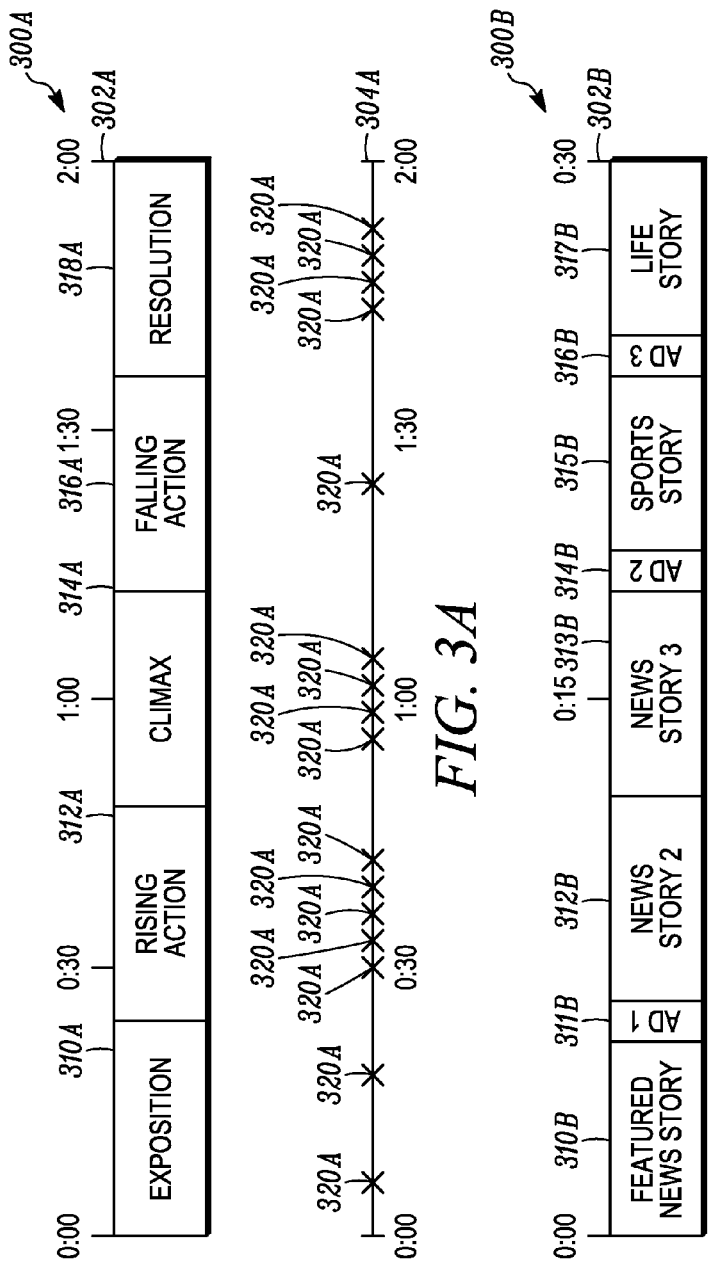
FIGS. 3A and 3B are representations corresponding to media files and a user's affinity therefor, in accordance with embodiments of the present disclosure.

Referring to FIGS. 3A and 3B, two representations 300A, 300B of user interactions recorded during the playing of media files 302A, 302B are shown with respect to timelines 304A, 304B. Referring to FIG. 3A, the representation 300A includes a media file 302A that is subdivided into component parts including an exposition 310A, a rising action 312A, a climax 314A, a falling action 316A and a resolution 318A, corresponding to the respective parts of a dramatic structure of the media file 302A that is known to those of skill in the art as a Freytag pyramid. The representation 300A also includes the timeline 304A, which is subdivided into half-hour increments and includes a series of static interactions 320A shown as received during the playing of respective portions of the media file 302A.

As is shown in FIG. 3A, the user provided several binary interactions 320A during the rising action 312A, the climax 314A and the resolution 320A, and a minimal number of interactions 320A during the exposition 310A or the falling action 316A. The frequency and number of the user interactions 320A received from the user during the respective portions of the media file 302A may then be associated with the user. Therefore, as is shown in FIG. 3A, it may be understood that the user enjoys or is strongly interested in the rising action 312A, the climax 314A and the resolution 320A, and is less interested in the exposition 310A or the falling action 316A.

Referring to FIG. 3B, the representation 300B includes a media file 302B that is subdivided into component parts including a featured news story 310B, a first advertisement 311B, a second news story 312B, a third news story 313B, a second advertisement 314B, a sports story 315B, a third advertisement 316B and a life story 317B, corresponding to the respective parts of a news broadcast or podcast. The representation 300B also includes the timeline 304B, which is subdivided into fifteen-minute intervals and includes a series of divisions corresponding to the respective parts 310B, 311B, 312B, 313B, 314B, 315B, 316B, 317B of the media file 302B. The timeline 304B is also shown as including a series of dynamic interactions representing actions taken by the user during the playing of the media file 302B, i.e., where the user played 320B, skipped or fast-forwarded 322B, rewound 324B or stopped 326B all or portions of the media file 302B, for example, by selecting a "play" button, a "fast-forward" button, a "rewind" button or a "stop" button, respectively.

As is shown in FIG. 3B, the user provided a number of different user interactions during the playing of the media file 302B that may be analyzed with respect to pertinent portions of the media file 302B and associated with the user. First, the user played 320B the entire featured news story 310B, but skipped 322B, or fast-forwarded, through the first advertisement 311B. Next, the user also played 320B, then rewound 324B and played 320B the second news story 312B again, and skipped 322B, or fast-forwarded, through the third news story 313B. Finally, the user then played 320B the second advertisement 314B and the sports story 315B, before stopping 326B the media file 326B at the third advertisement 316B, and before playing the life story 317B.

Therefore, based on the user's interactions during the playing of the media file 302B, it may be inferred that the user is very interested in the second news story 312B, which he or she played twice; that the user is at least mildly interested in the featured news story 310B, the second advertisement 314B or the sports story 315B; and that the user is not interested in the first advertisement 311B, the third news story 313B, the third advertisement 316B or the life story 317B. Such inferences may then be used for any purpose, including but not limited to gauging the popularity of the respective portions of the media file 302B based on whether the portions were watched, or not watched, by the user, or for targeting product offerings to the user based on the contents or themes of the portions of the media file 302B in which it is determined that he or she has an interest (i.e., primarily the second news story 312B, and also the featured news story 310B, the second advertisement 314B or the sports story 315B.

In accordance with some embodiments of the present disclosure, and as is depicted in the representations 300A, 300B shown in FIGS. 3A and 3B, a user's interactions may be captured in a binary manner (i.e., FIG. 3A), and also with regard to the user's actions in playing the media file (i.e., FIG. 3B). The systems and methods of present disclosure may also be used to obtain dynamic information regarding particular portions of a media file or the contents thereof.

Figure 4A:
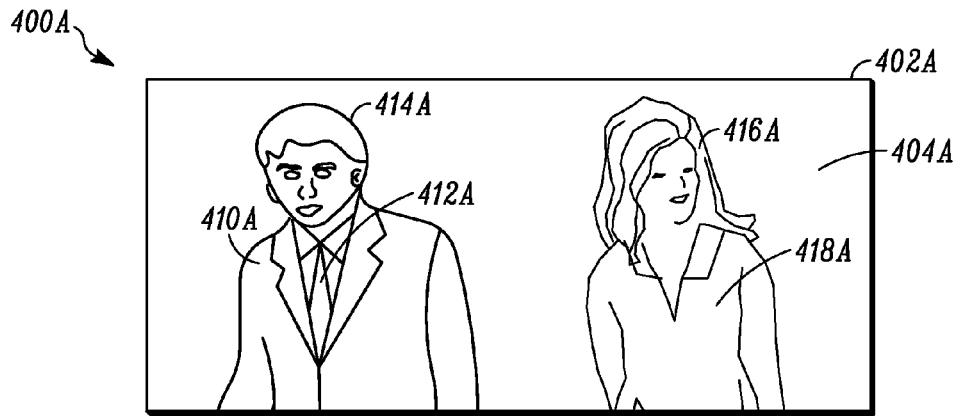
FIGS. 4A, 4B and 4C are representations of frames, images and/or other features displayed by methods and systems for tracking a user's affinity for one or more media files, or the contents thereof, in accordance with embodiments of the present disclosure.
Figure 4B:
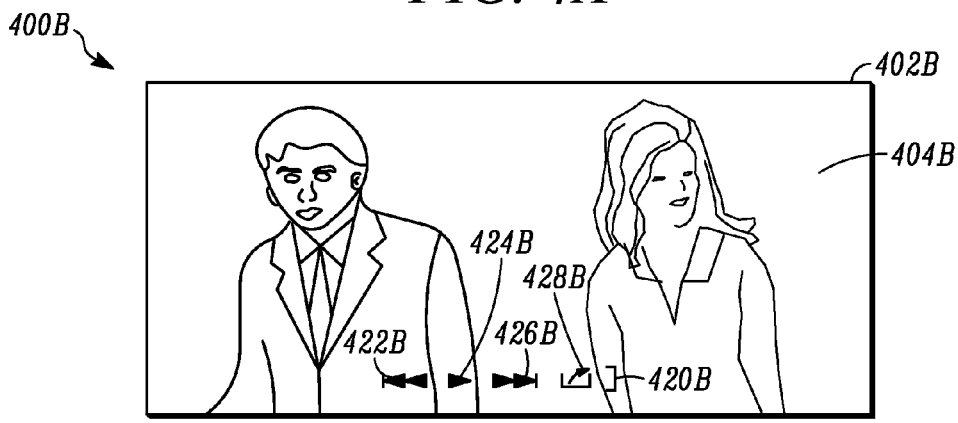
Figure 4C:
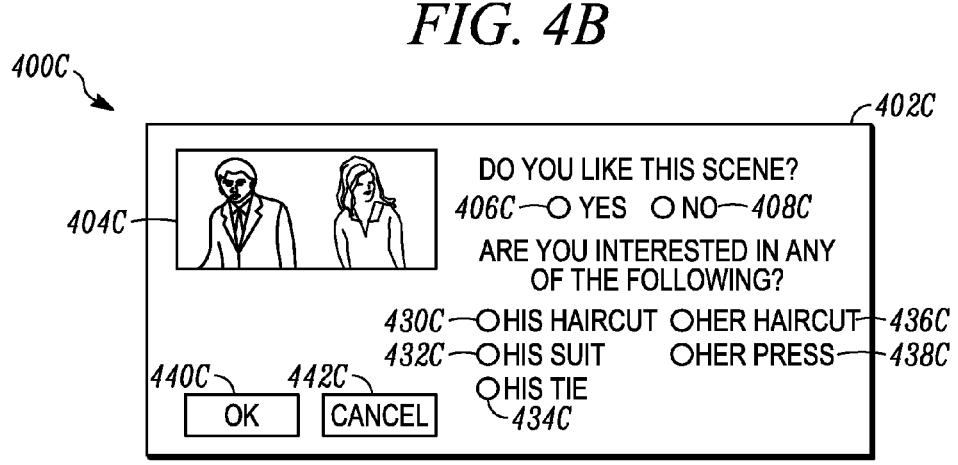

Referring to FIGS. 4A, 4B and 4C, a series of displays 400A, 400B, 400C shown by a media player in accordance with the present disclosure are shown. Referring to FIG. 4A, the display 400A includes a screen 402A showing a portion of a media file 404A being played on the media player. The portion of the media file 404A shows a first individual wearing a suit 410A and a tie 412A, and having a first hair style 414A, and a second individual having a second hair style 416A and wearing a dress 418A.

Referring to FIG. 4B, the display 400B includes a screen 402B showing a portion of a media file 404B. The screen 402B includes the same portion (e.g., the same frame) of the media file 404A shown in FIG. 4A, after a user has paused or stopped the playing of the media file 404A at that portion on the media player. The display 400B further includes a set 420B of virtual controls, such a selectable icon 422B for rewinding the media file 404B, a selectable icon 424B for resuming the playing of the media file 404B, a selectable icon 426B for advancing or fast-forwarding" the playing of the media file 404B, and a selectable icon 428B for requesting a menu for providing further interactions with the media file 404B.

Referring to FIG. 4C, the display 400C includes a screen 402C following the selection of the icon 428B shown in FIG. 4B, and includes a portion of the media file 404C in a window, as well as a set 420C of buttons or other features that may be selected by the user. The selection of the icon 428B shown in FIG. 4B causes the portion of the video file 404B shown in FIG. 4B to be condensed into the window, and also causes the set 420C of buttons may be displayed, such as in an overlay. Any other actions or features, such as the selection of a dedicated button on a media player console or remote control, may also be programmed to cause the portion of the video file 404B to be condensed into the window, or to cause the set 420C of buttons may be displayed.

Using the buttons or other selectable features shown in FIG. 4C, the user may provide the media player with any number of interactions regarding his or her interest in the portion of the media file 404C shown in the window, or the in the objects, images, sounds, individuals, things or themes expressed or described therein. For example, the user may provide an express indication of his or her interest or disinterest, respectively, in the portion of the video file 404C shown in the window by selecting options 406C, 408C. Additionally, the user may also indicate his or her interest in one or more of the features shown in the portion of the video file 404C shown in the window, such as by selecting option 430C to indicate his or her preference for the first hair style 414A, by selecting option 432C to indicate his or her preference for the suit 410A, by selecting option 434C to indicate his or her preference for the tie 412A, by selecting option 436C to indicate his or her preference for the second hair style 416A and by selecting option 438C to indicate his or her preference for the dress 418A. As is also shown in FIG. 4C, the user may cause his or her interactions to be recorded by selecting button 440C, or may cancel the operation by selecting button 442C.

Accordingly, the systems and methods of the present disclosure may be utilized to record static interactions of a user who is playing a media file on a media player, such as the binary interactions shown in the timeline 304A of FIG. 3A, or the actions taken in playing the media file, such as the interactions shown in FIG. 304B of FIG. 3B. The systems and methods of the present disclosure may also be utilized to record dynamic, express interactions of a user with the media file, such as the various interactions 420C shown on the display 402C depicted in FIG. 4C, regarding particular portions of the media file or the objects, images, sounds, individuals, things or themes expressed or described therein.

As is discussed above, a user's interactions with a media player or a media file, or any related information, may be captured and stored within the media file itself, and either analyzed at the media player, or transferred with the media file to a media service or other location for analysis. Alternatively, information regarding the user's interactions may also be stored in a record that may be maintained in a cache or shell file that is independent of the media file, and subsequently correlated with the features of the video file. By maintaining such a record independent of the media file itself, the systems and methods of the present disclosure may be used to receive user interactions during the playing of read-only media or other protected content, and may also minimize the volume of data that must be transmitted between the media player and a media source or other location where the interactions will be analyzed.

Figure 5:
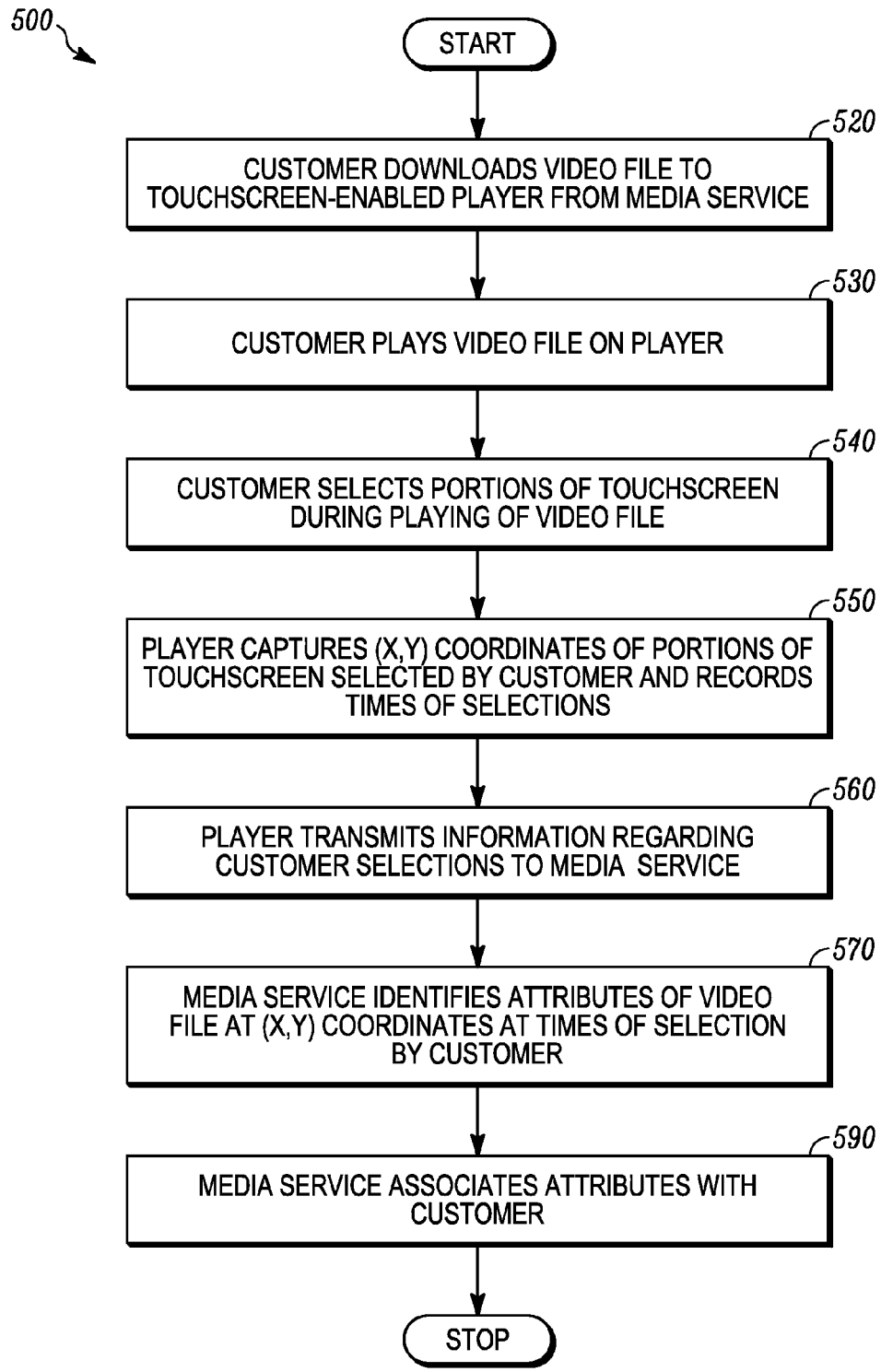
FIG. 5 is a flow chart of a method for tracking a user's affinity for one or more media files, or the contents thereof, in accordance with embodiments of the present disclosure.

Referring to FIG. 5, a flow chart 500 representing one embodiment of a method for tracking a user's affinity for one or more media files, or the contents thereof, based on his or her interactions with a computing device during the playing of a media file according to the present disclosure is shown. Except where otherwise noted, reference numerals preceded by the number "5" in FIG. 5 indicate components or features that are similar to components or features having reference numerals preceded by the number "2" shown in FIG. 2.

At step 520, a customer may download a video file to a touchscreen-enabled media player from a media service, and at step 530, the customer may begin to play the file on his or her media player. For example, a user of a tablet computer may order a movie, a video podcast or any other type of multimedia file from an online service or marketplace over the Internet, and play the file on his or her tablet computer. At step 540, the customer may select one or more regions or areas of the touch screen during the playing of the video file. For example, where a customer sees a particular object, image, individual, thing or scene expressed or described in the video file that he or she enjoys, or in which he or she has interest, the customer may touch the area of the touchscreen where the object, image, individual, thing or scene is shown during the playing of the media file.

At step 550, the player may capture the locations of the regions or areas of the touchscreen that were selected by the user, such as in a Cartesian (x, y) coordinate format, and record the times at which such portions were selected, with respect to the beginning or other portion of the media file. Such regions or areas may be identified as a single point, or with reference to a sector of the touchscreen (i.e., a polygon, a circle or other shape).

At step 560, the player transmits information regarding the user's selections, including the coordinates and/or the times at which the regions of the touchscreen were selected, to the media service from which the media file originated. Such transmissions may occur in real-time, if sufficient connectivity is available between the media player and the media service as the video file is being played, or stored in a record that is maintained in a cache or shell file and may be transmitted to the media service once a sufficient level of connectivity is restored.

At step 570, the media service correlates the coordinates of the locations of the touchscreen that were selected, and the times at which such locations were selected, to the attributes of the video file that were displayed at such locations and times during the viewing of the video file. For example, where the user selected coordinate $(x_1, y_1)$ of the touchscreen fifteen minutes into a two-hour long movie, the media service may determine what elements or features were shown at coordinate $(x_1, y_1)$ at the fifteen-minute mark of the movie, including the particular objects, images, individuals, things or themes expressed or described at that location of the screen during the playing of the movie at that time. At step 590, the media service associates the attributes of the video file that were identified at step 570 with the customer. For example, where the media service determines that a customer selected a particular building, a particular actress, or a particular automobile while watching the video file, the media service may determine that the customer prefers the particular building, actress or automobile that he or she selected, and may utilize this information to target marketing opportunities to the customer. The media service may coordinate with an online marketplace to directly offer other media files featuring the same building, actress or automobile, or may coordinate with an online marketplace to provide offers for the purchase of items pertaining to the building, actress or automobile to the customer that selected them during the playing of the media file.

Figure 6:
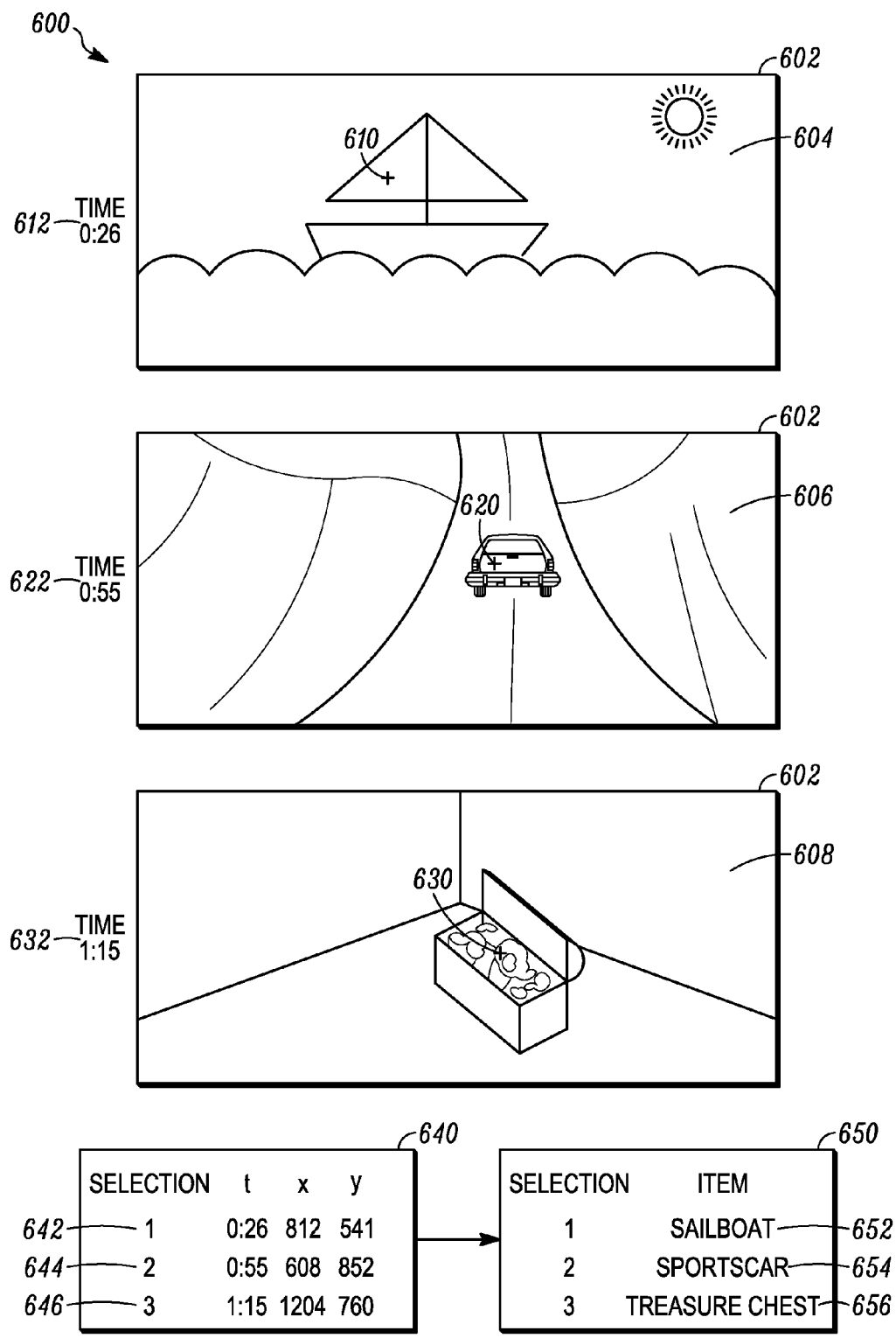
FIG. 6 is a representation of images and sets of data captured by methods and systems for tracking a user's affinity for at least one media file, or the contents thereof, in accordance with embodiments of the present disclosure.

One example of the correlation of the locations and times at which a customer selects an aspect of a touchscreen and the contents of a media file in accordance with the present disclosure is shown in FIG. 6. Referring to FIG. 6, a representation 600 of a media player display 602 showing a series of frames 604, 606, 608 of a video file, and sets 640, 650 of data is shown. In frame 604, a location 610 on the display 602 that is selected at a time 612 is shown. In frame 606, a location 620 on the display 602 that is selected at a time 622 is shown. In frame 608, a location 630 on the display 602 that is selected at a time 632 is shown.

In accordance with one or more of the systems and methods of the present disclosure, such as the process depicted in flow chart 500 of FIG. 5, a user's interactions with a media player during the playing of a media file, such as the selections of locations 610, 620, 630 on the display 602 as shown in FIG. 6, may be captured and stored in a record or other file. Referring to FIG. 6, the set 640 of data includes a line item 642 including the coordinates of the location 610 and the time 612 (i.e., a sailboat), a line item 644 including the coordinates of the location 620 and the time 622 (i.e., a sports car) and a line item 646 including the coordinates of the location 630 and the time 632 (i.e., a treasure chest). After the selections have been captured at the media player, the set 640 may be transmitted from the media player to the media service from which the video file originated, and analyzed by the media service to correlate the user's selections with the aspects of the video file that were shown at the selected locations and times. Referring again to FIG. 6, a set 650 of data is shown following an analysis of the set 640 of data by a media service. The set 650 includes an entry 652 corresponding to an aspect of the media file at the location 610 of the touchscreen selected by the user at time 612 (i.e., the sailboat), an entry 654 corresponding to an aspect of the media file at the location 620 of the touchscreen selected by the user at time 622 (i.e., the sports car) and an entry 656 corresponding to an aspect of the media file at the location 630 of the touchscreen selected by the user at time 632 (i.e., the treasure chest).

Information regarding a customer's interactions with one or more portions of a media file, such as the entries 652, 654, 656 shown in FIG. 6, may be associated with the user, and utilized for any purpose. For example, it may be determined that the user enjoys or is otherwise interested in the particular sailboat, sports car or treasure chest shown in the video at times 612, 622, 632, respectively, or that the user enjoys or is otherwise generally interested in sailboats or aquatic themes, sports cars or racing themes, or treasure or mystery themes. Thereafter, the media service may utilize such information and/or portions of the media file for any commercial purpose, such as to target marketing offers to the user pertaining to sailboats. Alternatively, such information and/or portions of the media file may be combined with that of other customers and analyzed in the aggregate, to gauge the popularity of the media file or the contents thereof among a plurality of customers, or for any other purpose. For example, such information and/or portions of the media file may be posted to one or more social network accounts or pages, transmitted via electronic mail or other messaging systems, or presented to the customer, or to other customers or prospective customers, for any purpose. Finally, where a portion of a media file relates or refers to a specific item or group of items, a customer's interaction with the portion of the media file may result in the addition of the specific item, or one of the group of items, being added to a virtual "shopping cart" for purchase by the customer, or a "wish list," or list of desired items, for future consideration for purchase by the customer, or on behalf of the customer by one or more other customers.

As is shown in the flow chart 500 of FIG. 5, and the representation 600 of FIG. 6, the systems and methods of the present disclosure may be utilized to receive interactions by a user who is playing a media file on a media player, to correlate the user's interactions with aspects of the media file, and to associate the correlated aspects with the user. Although the process depicted in FIG. 5 contemplates the use of a touchscreen-enabled media player, the systems and methods of the present disclosure are not so limited, and may be utilized with any other means for selecting a portion of a media file as it is being played, including a pointer that may be manipulated by a mouse, trackball, stylus or other feature on a non-touchscreen-enabled media player. Additionally, although the process depicted in FIG. 5 transmits information regarding a customer's selections from a media player to a media service (where the available processing power and capacity is presumably greater than that of the media player), the systems and methods of the present disclosure are not so limited, and the user's interactions may be analyzed using processors and/or other components on the media player, a media service or a third, external location. Moreover, data regarding a user's selections may be transmitted from the media player to the media service in real-time (i.e., during the viewing of the video file) or, alternatively, stored in a record maintained in a cache or shell file and transmitted to the media service once the viewing of the video file is complete, or when sufficient connectivity between the media player and the media service is restored.

Figure 7:
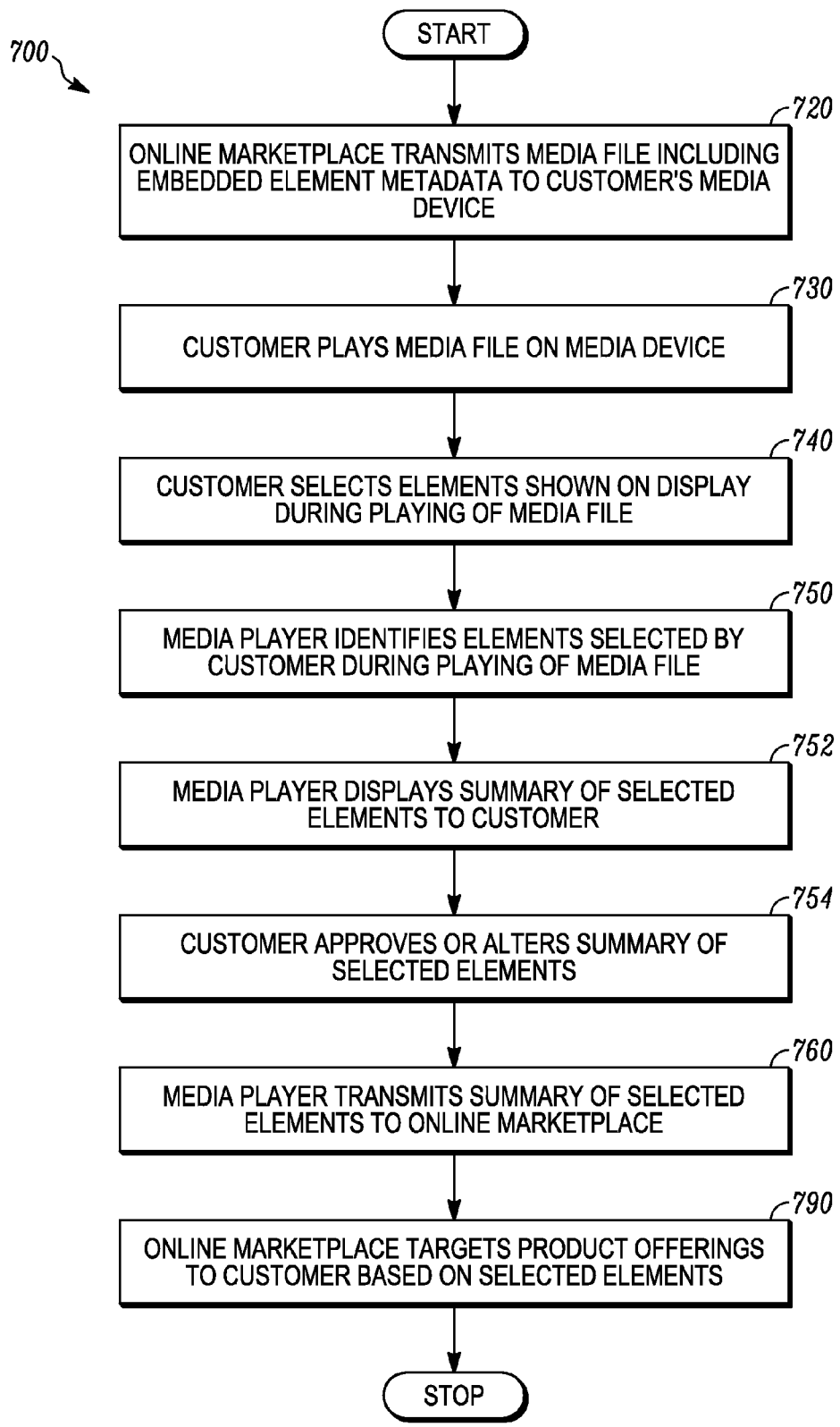
FIG. 7 is a flow chart of a method for tracking a user's affinity for one or more media files, or the contents thereof, in accordance with embodiments of the present disclosure.

As is discussed above, media files played by a media player in accordance with the systems and methods of the present disclosure may be modified to store metadata and/or other information regarding the objects, images, sounds, individuals, things or themes expressed or described therein, based on the user's interactions with the media player during the playing of the media files. Referring to FIG. 7, a flow chart 700 representing one embodiment of a method for tracking a user's affinity for one or more media files, or the contents thereof, based on his or her interactions with a computing device during the playing of a media file according to the present disclosure is shown. Except where otherwise noted, reference numerals preceded by the number "7" in FIG. 7 indicate components or features that are similar to components or features having reference numerals preceded by the number "5" shown in FIG. 5, or the number "2" shown in FIG. 2.

At step 720, an online marketplace transmits a media file including embedded element metadata to a customer's media device, and at step 730, the customer plays the media file on the media device. For example, where the media file is a video podcast or documentary on a sports-related topic, the media file may be embedded with metadata defining the edges, contours or outlines of the objects, or fragments thereof, shown therein (e.g., the outlines of any players, jerseys, stadiums, objects or other items depicted in the media file), such as by using active contour modeling. Any means or modeling tools for identifying objects within a video file, an image or a photograph may be embedded into media files in accordance with the present disclosure.

As the media file is playing, at step 740, the customer selects elements that are shown on the display. For example, the customer may select any of the objects shown on a touchscreen-enabled media player (e.g., using a finger or stylus), or by using a pointer-type device that may be manipulated with a mouse, a trackball or another like feature on a media player that does not include a touchscreen.

At step 750, the media player identifies the elements that have been selected by the customer. For example, where the element metadata identifies the perimeters of one or more designated features shown in the media file, a selection of any portion of the interior within the boundaries of one of the features may be interpreted as an interaction with or selection of that feature. At step 752, a summary of the elements that have been selected by the user may be displayed to the user. Such a summary may be preferably displayed after the playing of the media file is complete, or when the playing has been paused, such as in the form of an overlay or inset on the media file, but may also be displayed at any other time or in any format. For example, the summary may be sent to the customer via an electronic mail message or displayed on a web page to the customer on the media player or on another device.

At step 754, the customer may approve or alter the displayed summary of the selected elements. For example, upon completing the viewing of a media file, the customer may elect to remove some or all of the elements that he or she selected during the playing of the media file from consideration by the media player and/or the media service. Additionally, the customer may elect to add other elements that he or she failed to select during the playing of the media file to the summary, or alter the list to specify one or more reasons why he or she is interested in an element of the media file. At step 760, once the customer has finished approving or altering the summary of the selected elements, the summary may be transmitted from the media player to an online marketplace. The media player may transmit the summary to the online marketplace immediately, assuming that sufficient connectivity exists between the media player and the online marketplace, or may withhold the summary until sufficient connectivity is restored, i.e., when the media player is synchronized with a base computer or with the media service. At step 770, the online marketplace may then target product offerings to the customer based on the elements that he or she selected during the playing of the media file. For example, where the customer selected a particular model of smartphone, motorcycle or pair of shoes that was shown in the media file as it was being played, the online marketplace may subsequently transmit marketing efforts for the smartphone, motorcycle or shoes, or items related thereto (i.e., advertising for accessories for the smartphone, a motorcycle helmet, or a belt that matches the pair of shoes) to the customer.

Accordingly, the systems and methods of the present disclosure, such as the process depicted in the flow chart 700 of FIG. 7, may be utilized to receive interactions and other information from a user who is viewing a media file on a media player through one or more customizable interfaces that permits the user to alter and/or approve a summary of the interactions and information, and to correlate the interactions and information with some or all of the media file. Once the correlated portions of the media file have been associated with the user, information regarding the correlated portions may be utilized to target commercial opportunities to the user, to gauge the popularity of the correlated portions, or for any other purpose.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. While the present disclosure describes exemplary embodiments that may be associated with communications between media services and/or online marketplaces and their customers, the systems and methods of the present disclosure are not so limited, and may be utilized in connection with any computer-based electronic communication systems or methods.

For example, the systems and methods of the present disclosure are not limited to video files, and may be used with audio files or any other type of multimedia (e.g., electronic books or any other file). Next, the systems and methods disclosed herein are not limited to use on handheld or other computing devices, and may also be utilized with processor-driven televisions or other appliances that are adapted to receive or play media files, or any software or hardware associated therewith (e.g., a remote control or remote access system).

Moreover, interactions may be captured using any selectable features, including existing or dedicated buttons on media playing machines and/or associated hardware, or overlays displayed on one or more displays, and are not limited to the binary selection shown in FIG. 3A, the media playing interactions shown in FIG. 3B, or the touchscreen features shown in FIG. 4B, 4C or 6. Furthermore, information regarding such interactions and/or the playing of the media files may be analyzed in real-time or upon the completion of the viewing of the file, and may be analyzed at the media player or transmitted to a media service, online marketplace or any other location for analysis. Such information may be embedded in the actual media file or in an external shell file, or in any other form.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIGS. 2, 5 and 7, the order in which the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A mobile device comprising at least one computer processor and a video display having an input/output interface,
   wherein the mobile device is adapted to execute a computer program causing the mobile device to perform a method comprising:
   causing, by the at least one computer processor, a playing of at least one portion of a media file on the video display;
   receiving a first interaction with the input/output interface from a user during the playing of the at least one portion of the media file on the video display, wherein the first interaction comprises a selection of a first location on the input/output interface;
   transmitting information regarding the first interaction from the mobile device to a remote computer system over a network, wherein the information regarding the first interaction comprises information regarding at least the at least one portion of the media file or the first location; and
   receiving, from the remote computer system, information regarding an analysis of the first interaction, wherein the information regarding the analysis identifies at least one aspect within the at least one portion of the media file associated with the selection of the first location.

2. The mobile device of claim 1, wherein the method further comprises:
   transmitting a request for at least the media file from the mobile device to the remote computer system over the network; and
   receiving, at the mobile device, at least the media file from the remote computer system over the network.

3. The mobile device of claim 1, wherein the method further comprises:
   causing, by the at least one computer processor, a display of an overlay having at least one selectable feature on the input/output interface during the playing of the at least one portion of the media file on the video display,
   wherein the first interaction with the input/output interface is a selection of the at least one selectable feature.

4. The mobile device of claim 1, wherein the analysis of the first interaction identifies at least one item associated with the at least one portion of the media file, and wherein the method further comprises:
   transmitting a request for information regarding the at least one item associated with the at least one portion of the media file from the mobile device to an online marketplace over the network.

5. The mobile device of claim 4, wherein the method further comprises:
   receiving the information regarding the at least one item associated with the at least one portion of the media file from the online marketplace over the network; and
   causing a display of at least some of the information regarding the at least one item on the video display.

6. The mobile device of claim 5, wherein the at least some of the information comprises a plurality of selectable features, and
   wherein at least one of the plurality of selectable features is associated with the at least one aspect.

7. The mobile device of claim 5, wherein the method further comprises:
   condensing the at least one portion of the media file into a window on a first portion of the video display,
   wherein the at least some of the information regarding the information is displayed on a second portion of the video display.

8. The mobile device of claim 1, wherein the first interaction comprises at least one of:
   causing the playing of the media file to start;
   causing the playing of the media file to stop;
   advancing to one of the portions of the media file; or
   returning to one of the portions of the media file.

9. The mobile device of claim 1, wherein the at least one aspect within the at least one portion of the media file corresponds to at least one of:
   an object shown in the at least one portion of the media file,
   an image shown in the at least one portion of the media file,
   an individual shown in the at least one portion of the media file,
   a thing shown in the at least one portion of the media file,
   a sound played in the at least one portion of the media file, or
   a theme associated with the at least one portion of the media file.

10. The mobile device of claim 1, wherein the information regarding the first interaction comprises an altered version of the media file comprising metadata identifying the first location.

11. The mobile device of claim 1, wherein the method further comprises:
    causing a display of at least some of the information regarding the first interaction on the video display;
    receiving, at the input/output interface, a modification to the at least some of the information regarding the first interaction from the user; and
    transmitting information regarding the modification from the mobile device to the remote computer system over the network,
    wherein the analysis is based at least in part on the modification.

12. A computer-implemented method for tracking affinity of a user for at least one aspect of a media file, the method comprising:
    receiving, by at least one remote computing device over a network, a request for at least the media file from a mobile computing device operated by the user;
    transmitting at least the media file from the at least one remote computing device to the mobile computing device over the network;

receiving, by the at least one remote computing device over the network, information regarding at least one interaction by the user with the mobile computing device during a playing of the media file;

identifying, by the at least one remote computing device, a portion of the media file corresponding to the at least one interaction by the user;

identifying, by the at least one remote computing device, the at least one aspect in the portion of the media file; and associating, by the at least one remote computing device, the at least one aspect with the user.

13. The computer-implemented method of claim 12, wherein receiving the information regarding the at least one interaction by the user with the mobile computing device during the playing of the media file comprises:

receiving, by the at least one remote computing device over the network, a record comprising an identifier of the portion of the media file corresponding to the at least one interaction, wherein the identifier comprises at least one of a time of the media file, a chapter of the media file, a frame of the media file or a song stored on the media file.

14. The computer-implemented method of claim 12, further comprising:

identifying, by the at least one remote computing device, a personalized offer for at least one item corresponding to the at least one aspect for the user; and transmitting, by the at least one remote computing device over the network, the personalized offer for the at least one item to the mobile computing device.

15. The computer-implemented method of claim 12, further comprising:

posting, by the at least one remote computing device over the network, information regarding the at least one aspect and the at least one user to a social network.

16. The computer-implemented method of claim 12, further comprising:

identifying information regarding at least one other interaction by at least one other user with at least one other mobile computing device during at least one other playing of the media file on the at least one other mobile computing device;

aggregating the information regarding the at least one interaction and the information regarding the at least one other interaction; and rating the at least one portion of the media file based at least in part on the aggregated information regarding the at least one interaction and the information regarding the at least one other interaction.

\* \* \* \* \*